United States Patent [19]

Cuthbert et al.

[11] 4,141,506

[45] Feb. 27, 1979

[54] COMBINED RADIAL DIFFUSER AND CONTROL VALVE FOR HIGH-PRESSURE FANS

[75] Inventors: Jerry W. Cuthbert, Potomac; Sydney Davis, Silver Spring, both of Md.

[73] Assignee: The United States of America as represented by the Secretary of the Navy, Washington, D.C.

[21] Appl. No.: 816,054

[22] Filed: Jul. 15, 1977

[51] Int. Cl.[2] .......... B05B 1/32; B60V 1/14

[52] U.S. Cl. .......... 239/456; 180/117; 114/67 A

[58] Field of Search .......... 180/116, 117, 118, 119, 180/120, 121, 122, 125, 126; 114/67 A; 415/207, 209, 210, 148; 60/271, 242, 221; 239/456, 506, 512, 500; 251/144

[56] References Cited

U.S. PATENT DOCUMENTS 3,042,129 7/1962 Wade .......... 180/120

3,234,731 2/1966 Dermody et al. .......... 60/271

FOREIGN PATENT DOCUMENTS 1140563 1/1969 United Kingdom .......... 180/116

*Primary Examiner*—Carlton R. Croyle
*Assistant Examiner*—Donald S. Holland
*Attorney, Agent, or Firm*—R. Sciascia; R. Beers; S. Sheinbein

[57] ABSTRACT

A variable flow diffuser for use in air cushion vehicles to convert the kinetic energy of the moving air from the main fan into potential energy of air pressure. The conversion is accomplished by passing the air flow from the fan through a flow splitter and diverting it radially outward in all directions along a plane perpendicular to the initial direction of the air flow. The volume of air passing through the diffuser is controlled by placing control vanes around the flow splitter or by moving the flow splitter and a back plate in and out of the air channel.

5 Claims, 4 Drawing Figures

OPEN

CLOSED

COMBINED RADIAL DIFFUSER AND CONTROL VALVE FOR HIGH-PRESSURE FANS

BACKGROUND OF THE INVENTION

The present invention relates to gas diffusers for use with centrifugal and axial fans and more particularly to such diffusers for use with lift fans of surface effect ships.

Surface effect ships require that their lift systems should have minimum volume and weight, yet provisions must be made for high static efficiency under conditions of fluctuating demand characteristic of this kind of load. Unfortunately, conventional high efficiency fans of minimum weight and size have high gas flow velocities supplying gas with inordinately high amounts of kinetic energy. These fans ordinarily require the use of large gas diffusers which convert the kinetic energy of the flowing gas into the potential energy of pressure. Furthermore, it is characteristic of both axial and centrifugal fans that they operate at peak efficiency for a relatively narrow range of volume flow. Special difficulties may develop when the flow rate is reduced below some operating point for the machine. Surge or pulsation may result from unstable operating conditions and the machine can be damaged.

One approach for extending the range of volume flow at which a fan will operate at peak efficiency and for lowering the design flow rate point at which surge will occur is to provide an improved diffuser. Diffusers convert kinetic energy in the discharge from the rotor to pressure energy. In fans, as in other rotohydrodynamic machinery, all the energy imparted to the fluid is provided by the rotor, the energy in the air at the exit from the rotor being in the form of both pressure energy and kinetic energy. In a high efficiency fan with a well designed rotor the kinetic component of the total energy is higher than can be practically used. It is the function of the diffuser to convert this kinetic energy into potential energy by slowing down the air in an orderly manner. In the case of centrifugal fans, the air must first be collected in a volute built around the rotor which can additionally function as a diffuser if the cross-sectional area of the volute is made such that the average velocity at any section is less than that leaving the rotor. However, energy losses occur in this volute due to mixing of high and low velocity air if it is used as a diffuser.

A better system for use with centrifugal fans is to place a special chamber between the rotor and volute in which the air is allowed to slow down before entering the volute. This special chamber consists of set of parallel walls in which air leaving the rotor spirals outward in free vortex flow with resulting decrease in velocity at the outer edge of the chamber. In the case of axial flow fans, air leaving the outlet guide vanes of the fan must enter a long conical diffuser in which energy conversion takes place. However, all these diffuser systems suffer from the deficiency that they are bulky and not adjustable to compensate for varying demand flow rates through the fan.

Some adjustable flow rate diffusers which operate to vary the cross-sectional area of the diffuser chamber by sliding part of one wall of the chamber relative to the other wall, as exemplified by embodiments of U.S. Pat. No. 3,478,955, are available for use with centrifugal fans. These devices operate with mixed radial and tangential flow at high velocities, which conditions cause the flow to be unmanageable for varying flow rates and cause high friction and turbulence energy losses. Furthermore, such diffusers do not meet the size, weight, and configuration requirements of surface effect ship lift fan systems nor do they provide the valving action necessary on surface effect ships to completely block water from splashing into the diffuser and fan machinery when the fans are shut down so that the craft is off-cushion.

SUMMARY OF THE INVENTION

Accordingly, the present invention provides a variable flow diffuser for use in conjunction with either centrifugal or axial fans and particularly suited for use with the lift fans of surface effect ships. The diffuser functions to convert the kinetic energy of the air exiting a fan into the potential energy of pressure by slowing down the air in an orderly manner. This is accomplished by passing the air flow from the fan through a splitter and diverting it radially outward in all directions along a plane perpendicular to the initial direction of the air flow. The volume of the air passing through the diffuser is controlled by moving the flow splitter in and out of the air channel or by placing vanes around the flow splitter thereby enabling accomodation for varying flow rates through the fan, and in the case of lift systems of surface effect ships, allowing the diffuser to be completely blocked off, thereby preventing water from ingressing into the fan.

OBJECTS OF THE INVENTION

It is therefore an object of this invention to provide a gas diffuser of minimum size and weight.

Another object of the present invention is to provide a gas diffuser in which the volume of the flow may be adjusted in accordance with fluctuating loads.

A further object of the present invention is to provide a gas diffuser to simple and reliable design.

A yet further object of the present invention is to provide a gas diffuser of a configuration such that it may be easily installed and used in conjunction with the lift fans of surface effect ships.

Still another object of the present invention is to provide a gas diffuser which can act as a valve so as to prevent water from splashing up into the lift fans of surface effect ships.

BRIEF DESCRIPTION OF THE DRAWINGS

Other objects and many of the attendant advantages of the present invention will be readily apparent as the invention becomes better understood by reference to the following detailed description with the appended claims, when considered in conjunction with the accompanying drawings, wherein:

DESCRIPTION OF THE PREFERRED EMBODIMENT

Figure 1:
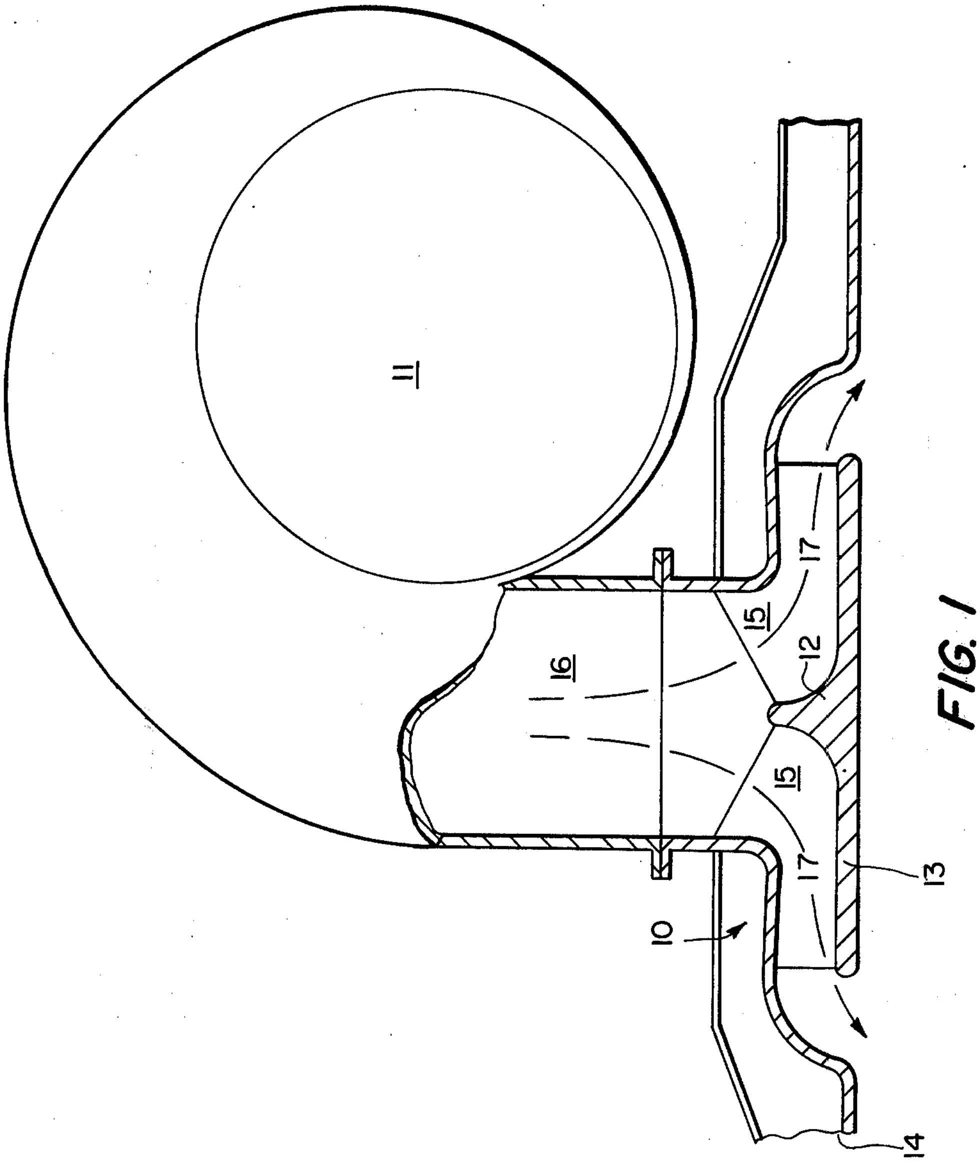
FIG. 1 is a central cut-away view of a first embodiment of the invention, partly in exploded view, installed on a centrifugal fan.

Referring now to the drawings wherein like reference characters designate like or corresponding parts throughout the several views, FIG. 1 shows a diffuser 10 installed on a centrifugal fan 11. Diffuser 10 is fixed and comprises an axisymmetric, streamlined flow splitter 12 attached integrally to a circular back plate 13. For simplicity of construction, back plate 13 in this version is shown as flat. Flow splitter 12 and back plate 13 are attached to the wet deck 14 of the ship by support and guide vanes 15 usually six or so which are arranged radially. In the class shown, diffuser 10 is recessed into the wet deck 14, but this is not essential, and it could be partly or fully exposed.

In operation, air is propelled by fan 11 down a cylindrical channel 16 where it encounters flow splitter 12. Flow splitter 12 splits the flow and diverts it radially outward into radial channels 17 where the flow is diffused to a lower velocity and higher pressure.

Figure 2:
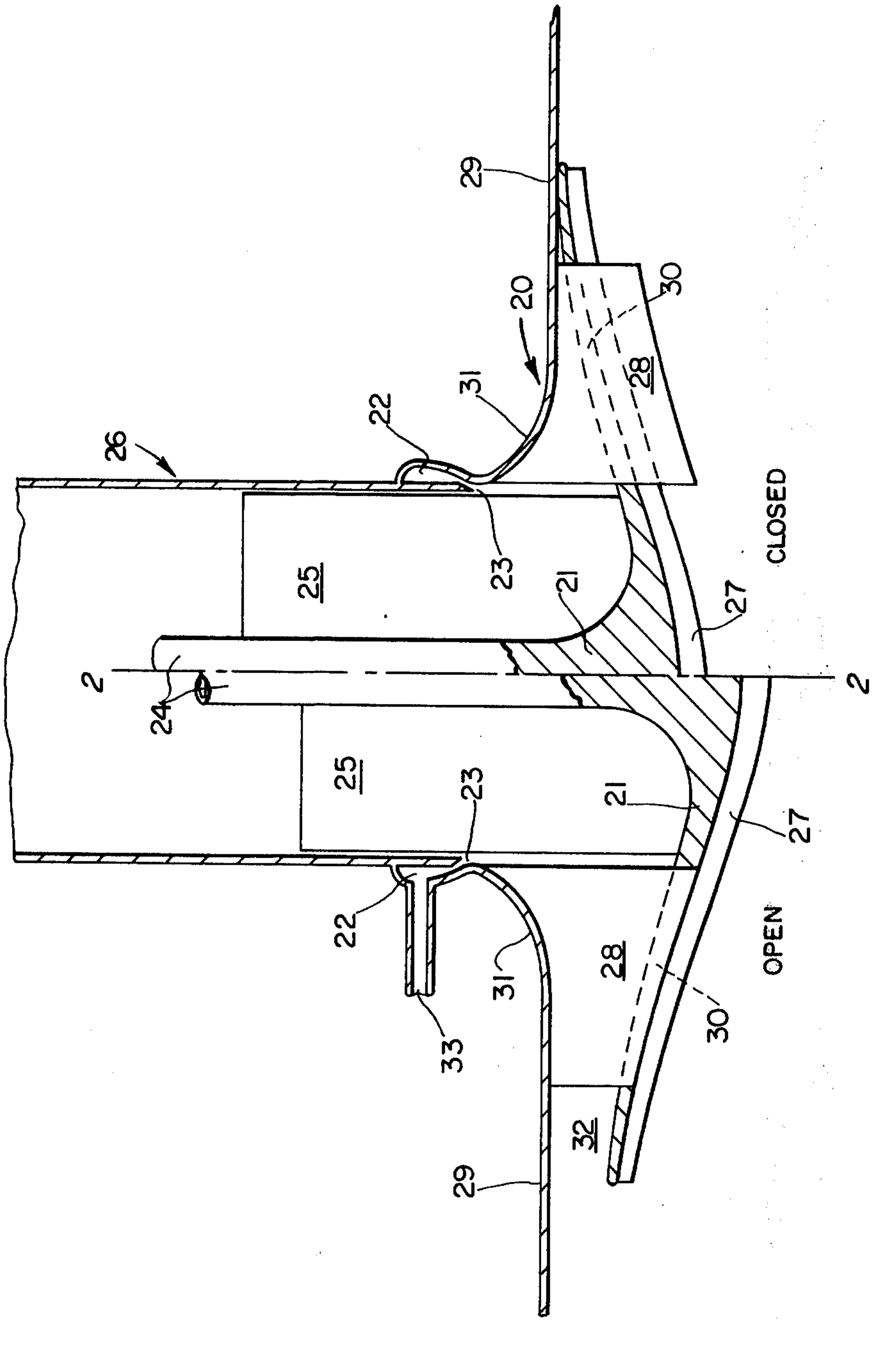
FIG. 2 is a cross-sectional view of a second embodiment of the invention in the open mode to the left of line 2—2 and in the closed mode to right of line 2—2 of FIG. 2.

Referring now to FIG. 2, selected parts of the diffuser 20 are designed so that they can be moved in the axial direction and diffuser 20 can, therefore, act to accommodate variable flow rates. An integral back plate and flow splitter 21 is shaped hydrodynamically to minimize loss of energy in the fluid as it turns from the axial to the radial direction. An annular space 22 provides a chamber from which air may either be blown or sucked from supply pipe 33 through slot 23 for some form of boundary layer control. For example, by use of the Coanda effect, which permits a layer of air to remain attached to the wall preventing a critical adverse pressure gradient in the bend, or by removal of low momentum air in the boundary layer, better flow is provided around the bend.

When acting as a valve diffuser 20 is actuated by a vertical stem 24 which is connected to a control system (not shown) at its upper end which could, for example, comprise a ball-screw system or a hydraulic cylinder. Inner radial blades 25 are integral with the vertical stem 24 and flow splitter and back plate 21 and provide rigidity to the arrangement as well as a means of guiding the system vertically in the channel 26. Stiffeners 27 are shown on the flow splitter and back plate 21. The outer radial vanes 28 are attached to the wet deck structure or front plate 29. Slots 30 in the outer part of flow splitter and back plate 21 provide spaces into which radial vanes 28 may extend so as to allow the diffuser 20 to move freely in the vertical direction.

In operation, air is propelled down channel 26 where it flows past slots 23 which may either blow or suck air from chamber 22. The flow is split and diverted radially outward into channel 32 by flow splitter and back plate 21. Air sucked or blown from slots 23 helps provide boundary layer control as the flow is diverted around bend 31. In radial channel 32 the flow is diffused to a lower velocity and higher pressure. The depth of channel 32 may be adjusted by moving the flow splitter and back plate 27 relative to the channel 26 and deck 29 by means of stem 24. Thereby, varying flow rates may be accommodated between the fully open, full-flow position shown to the left of line 2—2 and the fully closed, no-flow position shown to the right of line 2—2.

Figure 3:
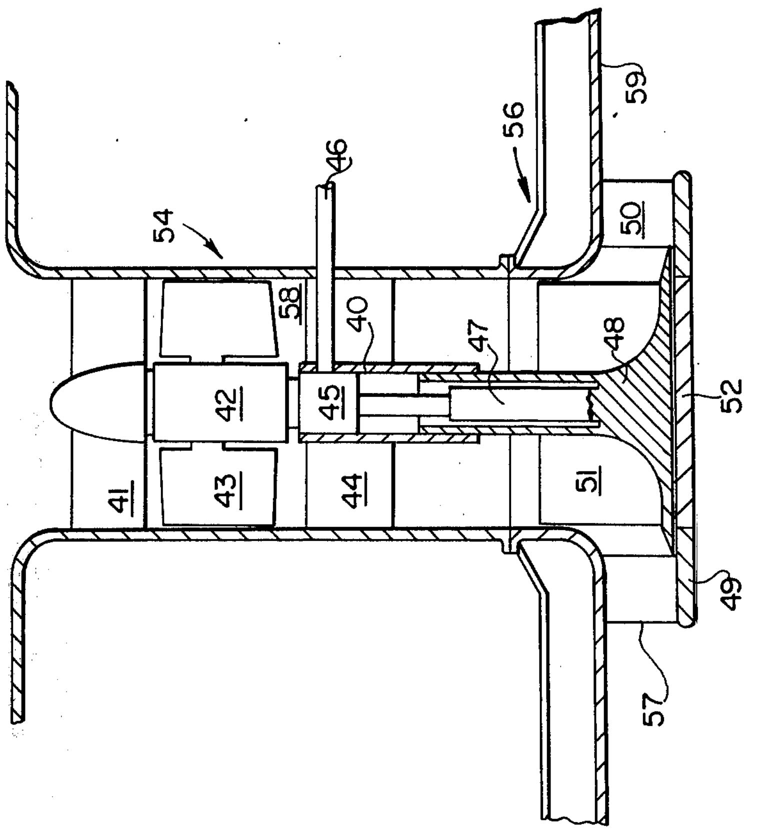
FIG. 3 is a cross-sectional view of a third embodiment of the invention installed on an axial flow fan.

FIG. 3 show an arrangement for an axial flow fan. Fan 54 comprises a set of fixed entrance vanes 41 which support the fan shaft 42 and fan blades 43 connected thereto. Guide blades 44 support gearing 45 driven by shaft 46. Vertical stem 47 of diffuser 56 is contained and actuated by a control system (not shown) within the fairing 40 behind fan gearing 45 which could, for example, comprise a ball-screw system or a hydraulic cylinder. Flow splitter 48 is, in this case, free to move separately from back plate 49. Back plate 49 is fixed to the wet deck 59 by means of the outer radial vanes 50 while the inner radial vanes 51 move with the flow splitter 48. The center section 52 of back plate 49 may be omitted or may move with the splitter 48. This arrangement is possible for the other types of fans such as mixed flow fans or centrifugal fans.

In operation, air is directed by entrance vanes 41 to fan blades 43 which propel it down channel 58 through guide vanes 44 to diffuser 56. Inner radial vanes 51 guide the flow down and then outward as the flow is split by flow splitter 48 and diverted radially outward in the diffuser 56. Outer radial vanes 50 guide the flow radially outward in channel 57 where it is diffused to a lower velocity and higher pressure. The position of the flow splitter 48 may be adjusted relative to channel 58 by means of stem 47 whereby, when flow splitter 48 is in the fully up position, all flow of whatever type, in and out of channel 58, may be blocked.

Figure 4:
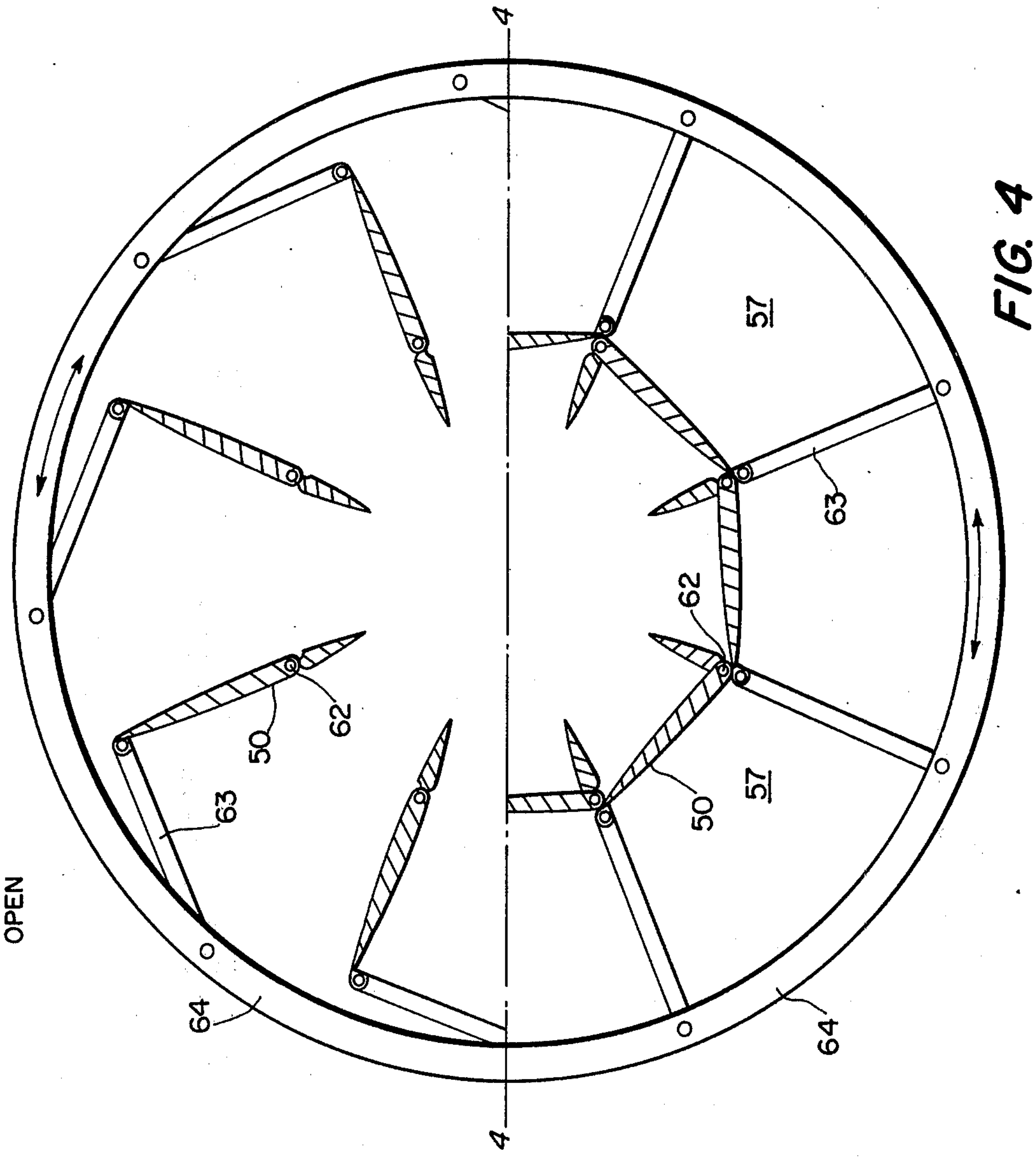
FIG. 4 is a lateral cross-sectional view of a set of adjustable guide vanes in the open mode above line 4—4, and in the closed mode below line 4—4 of FIG. 4.

FIG. 4 shows an arrangement by which the outer guide vanes 50 of FIG. 3 may be used for closing off the air flow in diffuser 56. The outer guide vanes 50 are pivoted at hinges 62 and actuated by means of levers 63 which in turn are actuated by oscillating ring 64.

In the open position, guide vanes 50 extend radially outward as shown above line 4—4. When oscillating ring 64 is rotated clockwise, guide vanes 50 rotate around pivots 62 until they extend laterally across channel 57 completely blocking radial flows as shown below line 4—4.

Therefore, there has been provided a diffuser system which will make possible the design of highly efficient fans without the large volume and weight penalty normally incurred with conventional fans. The requirements for surface effect ships (SES) are that their lift fans have minimum volume and weight yet high static efficiency. This invention will permit the use of high efficiency fans for surface effect ships and other purposes with small volumes and weights. By use of a radial diffuser fan volutes can be designed with a minimum cross-section, the diffusing taking place in a compact radial diffuser. Additionally, a conventional volute uses volume in the body of the ship where volume is at a premium, whereas the radial diffuser is located at the edge of the superstructure, is narrow, and therefore creates minimum interference with internal arrangements. Further, the radial diffuser can be used as a valve. This is important for two reasons in control of the lift system. First, it is necessary to install valves for all individual fans operating from the same engine so individual fans can be closed off when not required and, off bubble, it is necessary to close the outlet to prevent water entering and damaging the lift fans. The use of the radial diffuser eliminates the need for additional valve because the diffuser can act as a valve itself. Second, by use of the diffuser as a proportional valve it is possible to change the characteristics of individual fans without changing fan speed or geometry thereby accommodating various air flows and associated loads on the SES. The present invention allows a broad range of flow rates to be accommodated without high friction or efficiency losses.

Obviously, other embodiments and modifications of the present invention will readily come to those of ordinary skill in the art having the benefit of the teachings presented in the foregoing description and the drawings. It is, therefore, to be understood that this invention is not to be limited thereto and that said modifications and embodiments are intended to be included within the scope of the appended claims.

What is claimed and desired to be secured by Letters Patent of the United States is:

1. A diffuser for converting the energy of a fluid moving in a flow channel from kinetic energy of motion into potential energy of pressure, comprising:
   - a flow splitter for diverting the flow radially outward from said channel;
   - a back plate extending radially out from said flow splitter for confining the fluid as it flows outward;
   - means coextensive with said back plate so a diffuser channel of outwardly increasing flow area is formed between said coextensive means and back plate for confining said fluid as it flows outward and for slowing down said fluid in an orderly and efficient manner;
   - means for adjusting the position of said flow splitter in relation to said flow channel and coextensive means so as to vary the flow area of said diffuser channel whereby said diffuser can accomodate different flow rates; and
   - said adjusting means operates only to adjust the position of the flow splitter while the back plate is held fixed relative to said flow channel whereby said flow splitter can act as a valve completely blocking flow through said flow channel when said flow splitter is positioned abutting said coextensive means in said flow channel.

2. The diffuser of claim 1, wherein:
   - said adjusting means comprises a stem connected to said flow splitter and extending into said flow channel along an axis;
   - whereby the position of said flow splitter relative to the back plate may be axially adusted and said diffuser can thereby accomodate different flow rates.

3. A diffuser for converting the energy of a fluid moving in a flow channel from kinetic energy of motion into potential energy of pressure, comprising:
   - a cylindrical flow splitter for diverting the flow radially outward from said channel in a plane perpendicular to the axis of said flow channel;
   - a back plate extending radially out from said flow splitter for confining the fluid as it flows outward;
   - means coextensive with said back plate so a diffuser channel of outwardly increasing flow area is formed between said coextensive means and back plate for confining said fluid as it flows outward and for slowing down said fluid in an orderly and efficient manner;
   - said back plate and said coextensive means extend radially outward from the flow splitter perpendicular to the flow channel and said diffuser channel extends outward radially between them;
   - means for adjusting the position of said flow splitter in relation to said flow channel and coextensive means so as to vary the flow area of said diffuser channel whereby said diffuser can accomodate different flow rates;
   - said adjusting means operates only to adjust the position of the flow splitter while said back plate is held fixed relative to said flow channel whereby said flow splitter can act as a valve, completely blocking flow through said channel when said flow splitter is positioned abutting said coextensive means in said flow channel.

4. A diffuser for converting the energy of a fluid moving in a flow channel from kinetic energy of motion into potential energy of pressure, comprising:
   - a cylindrical flow splitter for diverting the flow radially outward from said channel in a plane perpendicular to the axis of said flow channel;
   - a back plate extending radially out from said flow splitter for confining the fluid as it flows outward;
   - means coextensive with said back plate so a diffuser channel of outwardly increasing flow area is formed between said coextensive means and back plate for confining said fluid as it flows outward and for slowing down said fluid in an orderly and efficient manner;
   - said back plate and said coextensive means extend radially outward from the flow splitter perpendicular to the flow channel and said diffuser channel extends outward radially between them;
   - means for adjusting the position of said flow splitter in relation to said flow channel and coextensive means so as to vary the flow area of said diffuser channel whereby said diffuser can accommodate different flow rates; and
   - guide vanes extend across said diffuser channel to direct the gas flow outward, the orientation of said guide vanes being adjustable to vary the flow area of the diffuser channel.

5. A diffuser for converting the energy of a fluid moving in a flow channel from kinetic energy of motion into potential energy of pressure, comprising:
   - a flow splitter for diverting the flow radially outward from said channel;
   - a back plate extending radially out from said flow splitter for confining the fluid as it flows outward;
   - means coextensive with said back plate so a diffuser channel of outwardly increasing flow area is formed between said coextensive means and back plate for confining said fluid as it flows outward and for slowing down said fluid in an orderly and efficient manner;
   - means for adjusting the position of said flow splitter in relation to said flow channel and coextensive means so as to vary the flow area of said diffuser channel whereby said diffuser can accommodate different flow rates; and
   - guide vanes extending across said diffuser channel to direct the gas flow outward, the orientation of said guide vanes being adjustable to completely close said channel and thereby block any ingress of water into said diffuser.

* * * * *